Dec. 30, 1924.
P. BRUINEKOOL
WEEDER
Filed Aug. 6, 1923
1,521,503
3 Sheets-Sheet 1
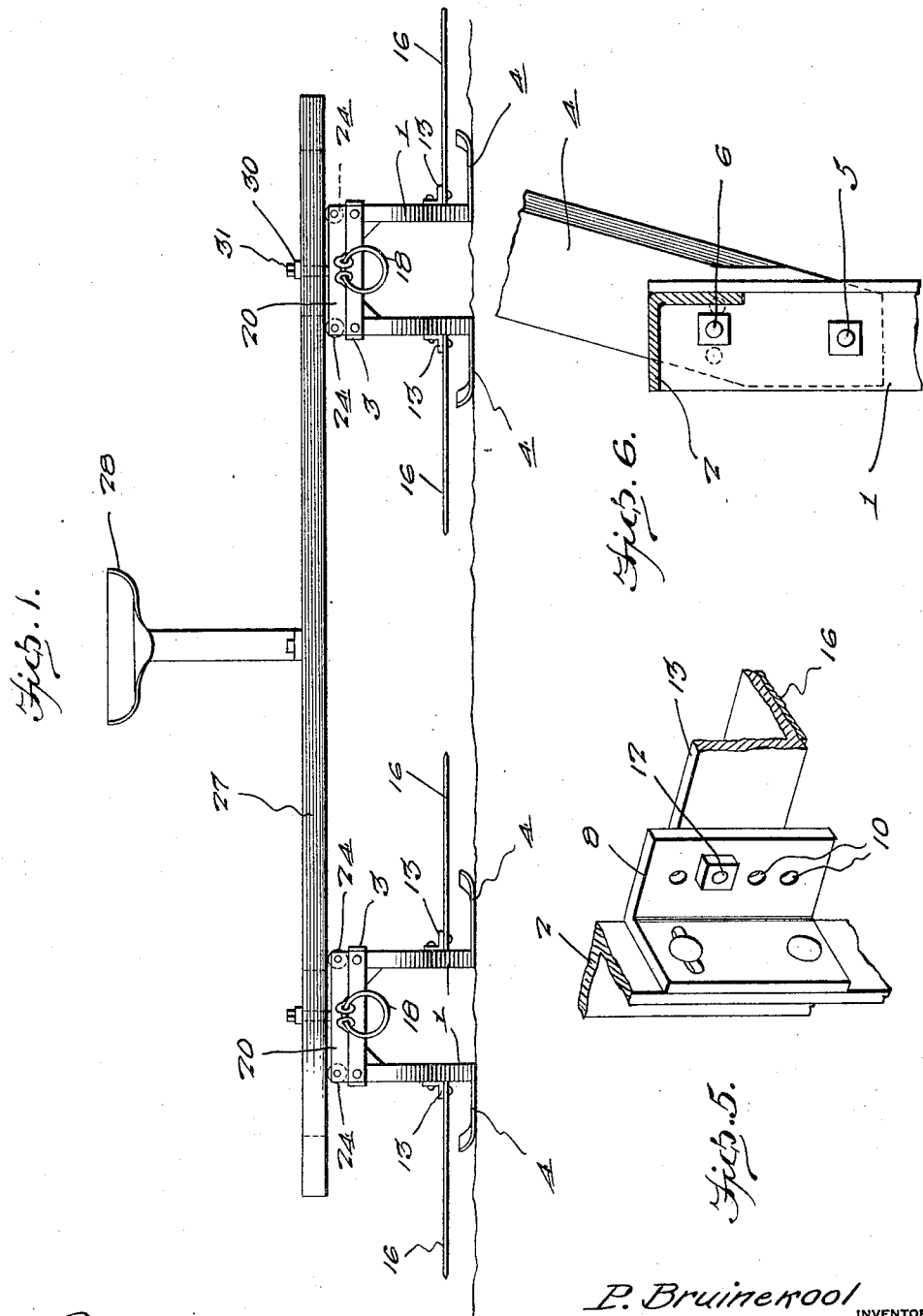

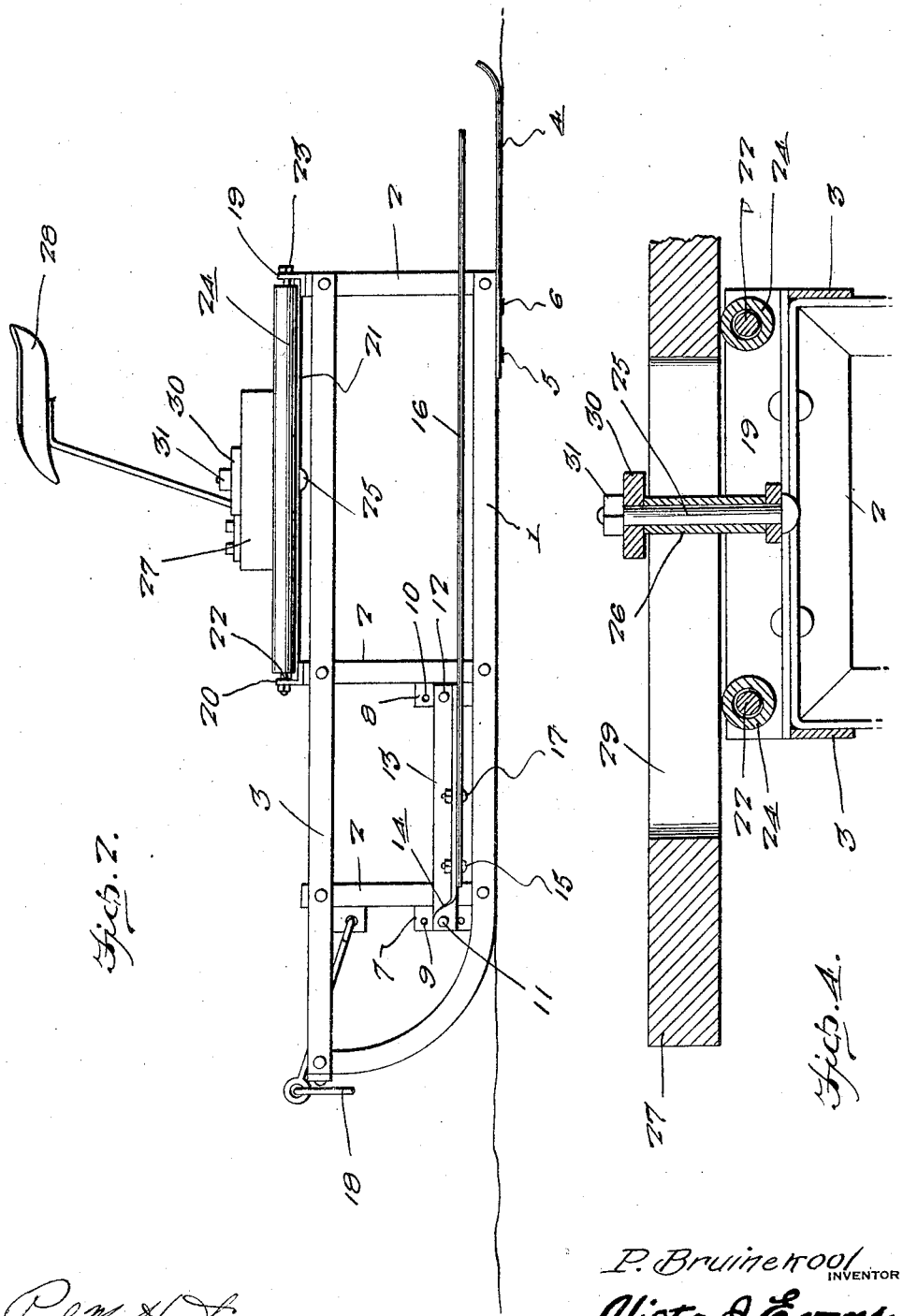

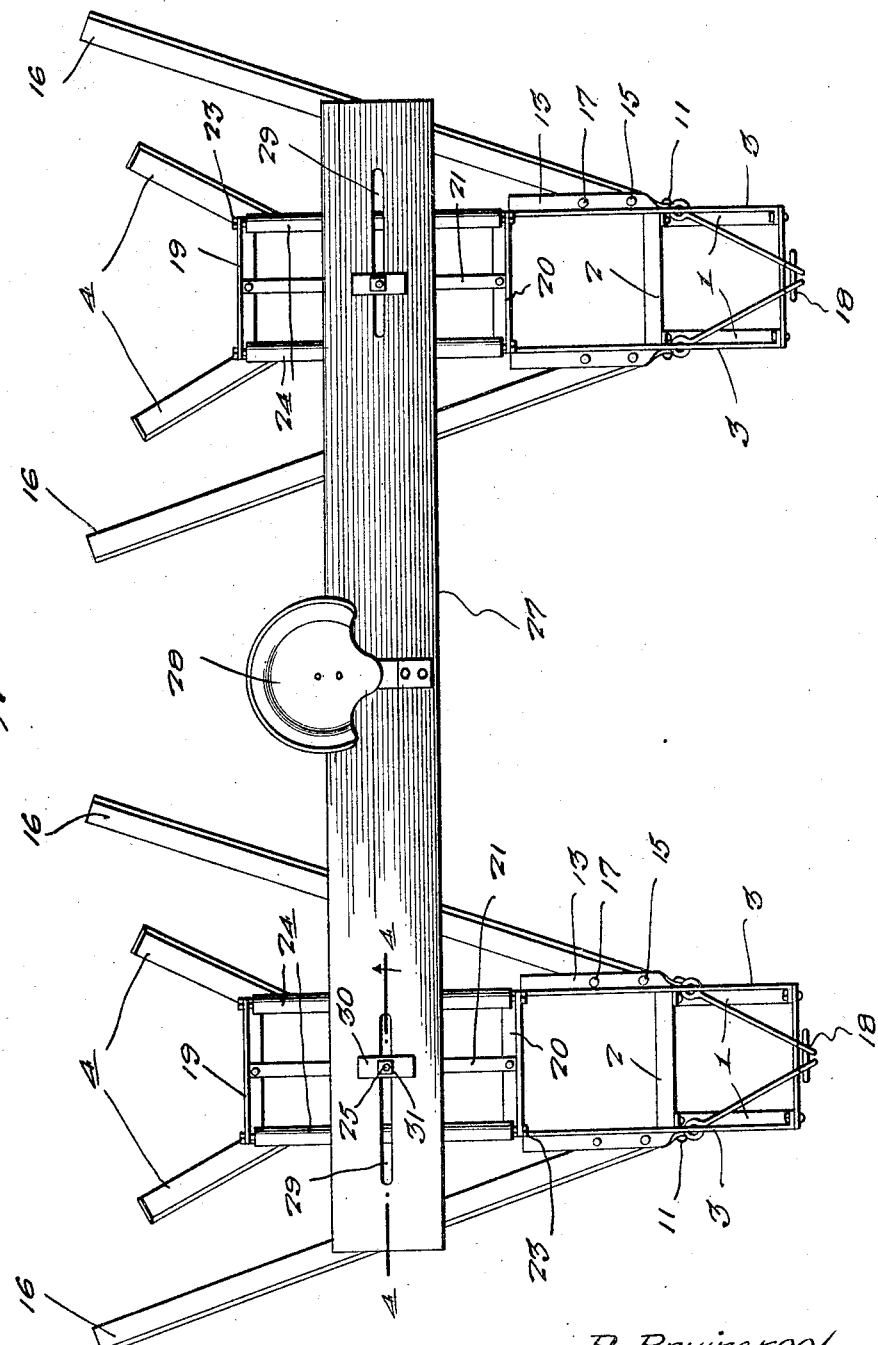

Patented Dec. 30, 1924.

1,521,503

UNITED STATES PATENT OFFICE.

PETER BRUINEKOOL, OF DENSMORE, KANSAS.

WEEDER.

Application filed August 6, 1923. Serial No. 656,008.

*To all whom it may concern:*

Be it known that I, PETER BRUINEKOOL, a citizen of the United States, residing at Densmore, in the county of Norton and State of Kansas, have invented new and useful Improvements in Weeders, of which the following is a specification.

My present invention has reference to a machine for cutting weeds between rows of growing plants.

An object is to produce a device of this character which will effectively and accurately cut weeds without inflicting injury to rows of plants regardless of irregularities between such rows.

A further object is to produce a weed cutting machine that comprises two frames which are substantially U-shaped in cross section and which are mounted on runners, the runners having at their rear ends rearwardly inclined angularly disposed knives, and the frames having on their sides similar knives which, however, are adjusted, while resting on rollers journaled on the frame there is a seat carrying beam or plank slotted to limit the lateral movement of one frame with respect to the other, and wherein the draft animals hitched to the respective frames may influence the frames in a sideway direction to cut weeds between rows of plants irrespective of irregularities between such rows.

To the attainment of the foregoing and other objects which will present themselves as the nature of the invention is better understood, reference is to be had to the drawings which accompany and form part of this application.

In the drawings:—

Figure 1 is a front view of a weeding machine in accordance with this invention.

Figure 2 is a side elevation thereof.

Figure 3 is a top plan view thereof.

Figure 4 is a sectional view on the line 4—4 of Figure 3.

Figure 5 is a view illustrating the manner in which the frame carrying knives may be adjusted to assume different angles.

Figure 6 is a section through one of the brace members taken directly above and looking toward one of the runners and one of the knives.

Except for the seat carrying board or beam, my improvement is preferably wholly constructed of metal.

The improvement essentially comprises two frames, each of which being substantially U-shaped in cross section. Each frame has its bottom in the nature of angle irons, and these angle irons provide runners 1. The forward end of the runners are rounded upwardly. Secured to the runners at determined spaced intervals there are substantially inverted U-shaped angle iron brace members 2 that provide the frame proper. Connected to the upper edge of the rounded forward portion of the runners and to the sides of the U-shaped members 2 there are longitudinally arranged plates 3. The frames may be otherwise suitably braced.

On their under faces, and at the rear portions thereof, each of the runners 1 has secured thereto a rearwardly extending angularly disposed cutting element or knife 4. Preferably two removable elements connect each knife to each runner, one of said elements, 5, being in the nature of a pivot, the other element 6 designed to be received through one of a plurality of spaced openings arranged concentric with respect to the pivot 5, and whereby the knives 4 may be arranged at desired angles with respect to the runners and the frames.

Secured to each of the U-shaped members of the frame adjacent to the forward end thereof there are angle brackets 7 and 8 respectively. The outer elements of the brackets are disposed approximately flush with the sides of the frame and are each provided with a plurality of equi-distantly spaced openings 9 and 10 respectively. Through certain of these openings there are passed removable securing elements 11 and 12 respectively that adjustably sustain on the sides of the frames angle plates 13. The plates 13 may be arranged at varying angles with respect to the sides of the frames by arranging the securing elements in different openings in the brackets 7 and 8, and the said securing elements are preferably in the nature of short bolts which are engaged by nuts. Preferably the lower horizontal and outwardly extending flange of the angle plates 13 are bent against the vertical flanges at the forward end thereof, as indicated by the numeral 14, and through this portion of the plates the securing elements 11 pass. The horizontal flange of each of the angle plates 13 is provided with a forward opening, and if desired, a plurality of rear openings arranged concentric with the forward opening. Through the forward opening there is passed a removable pivot 15 for a cutting element in the nature of a knife 16. The knife has an opening therethrough that is designed to register with any one or the rear openings in the angle plate, and through this opening and through one of the referred to openings in the angle plate there is passed a removable pivot 17. Preferably all of the pivots are in the nature of short bolts which are engaged by nuts, and by an arrangement as above described, the knives 16 may be adjusted at both lateral and vertical angles with respect to the frames.

Each of the frames has secured at its forward end means 18 to which is secured the trace or double tree of a draft animal.

Secured to the rear and to the inverted U-shaped member next to the rear of each of the frames there are angle irons 19 and 20 respectively. Centrally connecting these angle irons there is a plate 21. Passing through suitable openings in the vertical flanges of the angle irons 19 and 20 adjacent to the corners thereof there are bolts 22 respectively. Each bolt is engaged by a nut 23. On each bolt there is journaled a tubular member 24. Passing centrally through the plate 21 there is a bolt 25. This bolt is surrounded by a sleeve 26.

Supported on the tubes or rollers 24 there are the ends of a board or beam 27. The beam has centrally secured thereto the driver's seat 28 and inward of its ends, the said beam is provided with longitudinal somewhat elongated openings 29. Through the respective openings the bolts 25 of the frames pass. The sleeves or rollers 26 are of a size to slightly contact with the longitudinal walls provided by the openings in the beam. Over each bolt 25, and over the beam there is arranged a plate 30 that has an opening through which the bolts 25 pass. Screwed on each of the bolts and contacting with each of the plates 30 there is a nut 31.

As previously stated, a draft animal is attached to each frame and the animal is, of course, controlled by the driver on the seat 28. The machine is driven so that the frames are centrally arranged with respect to rows of growing plants. The knives on the opposite sides of the respective frames will act upon the weeds to cut the same. The forward knives will have a tendency to cut the upper parts of the weeds and to bend the lower portions thereof so that the same can be effectively operated on by the rear knives. Because of irregularities between rows of growing plants, it is necessary that the frames be permitted a lateral movement with respect to each other, and this is accomplished by the draft animals, controlled, of course, by the driver. A side movement of one frame with respect to the other causes the beam to move on the rollers 24, and such movement is limited by the contact of the roller or sleeve 26 with the end walls provided by the slots in the beam 27. The knives, as previously stated, may be adjusted, and it is thought that the foregoing description when taken in connection with the drawings will fully set forth the construction, operation and advantages of the improvement to those skilled in the art to which such inventions relate. It is deemed necessary, however, to add that I do not hold myself restricted to the precise structural details herein set forth, but am entitled to such changes therefrom as fairly fall within the scope of what I claim.

Having described the invention, I claim:—

A weed cutter comprising spaced substantially U-shaped frames each mounted on runners which have their forward ends rounded upwardly and to each of which frames a draft animal is hitched, rearwardly disposed angularly arranged knives on the bottom and at the rear of each runner, angle plates having their ends adjustably secured to the sides of the frame, a rearwardly extending knife pivoted to each angle plate, means permitting the lateral adjustment of the knives on said plates, rollers journaled on the top of each frame, a slotted seat carrying beam resting on the rollers, antifrictional means supported from the frame received in the slots of the beam, and means carried thereby contacting the upper face of the beam for holding the latter on the rollers.

In testimony whereof I affix my signature.

PETER BRUINEKOOL.